(12) United States Patent
Fox (10) Patent No.: US 10,219,663 B2
(45) Date of Patent: Mar. 5, 2019

(54) VACUUM-ASSISTED-PUMPING SYSTEM AND METHOD

(71) Applicant: Samuel Dale Fox, Langley (CA)

(72) Inventor: Samuel Dale Fox, Langley (CA)

( * ) Notice: Subject to any disclaimer, the term of this patent is extended or adjusted under 35 U.S.C. 154(b) by 0 days.

(21) Appl. No.: 15/219,059

(22) Filed: Jul. 25, 2016

(65) Prior Publication Data

US 2018/0023596 A1   Jan. 25, 2018

(51) Int. Cl.
| | | |
|---|---|---|
| A47L 7/00 | (2006.01) | |
| F04D 13/16 | (2006.01) | |
| F04F 3/00 | (2006.01) | |
| E04D 13/04 | (2006.01) | |
| F04D 15/02 | (2006.01) | |
| E03B 1/04 | (2006.01) | |
| F01P 5/00 | (2006.01) | |
| E04G 23/00 | (2006.01) | |

(52) U.S. Cl.
CPC ........... *A47L 7/0028* (2013.01); *A47L 7/0038* (2013.01); *F04D 13/16* (2013.01); *A47L 7/0023* (2013.01); *E03B 1/041* (2013.01); *E03B 2001/047* (2013.01); *E04D 13/04* (2013.01); *E04D 13/0404* (2013.01); *E04G 23/00* (2013.01); *F01P 5/00* (2013.01); *F04D 15/0218* (2013.01); *F04F 3/00* (2013.01)

(58) Field of Classification Search
CPC .... A47L 7/0023; A47L 7/0028; A47L 7/0038; A47L 11/00; A47L 11/38; F04D 13/16; F04D 15/0218
See application file for complete search history.

(56) References Cited

U.S. PATENT DOCUMENTS

| | | | | |
|---|---|---|---|---|
| 3,757,812 A | * | 9/1973 | Duncan | E04D 13/0409 137/142 |
| 4,080,104 A | * | 3/1978 | Brown, Jr. | A47L 7/0028 15/353 |
| 4,133,072 A | | 1/1979 | Face, Jr. | |
| 4,248,258 A | * | 2/1981 | Devitt | E04D 13/0404 137/124 |
| 4,514,977 A | | 5/1985 | Bowen | |
| 4,576,197 A | * | 3/1986 | Kempers | B67D 7/68 137/1 |

(Continued)

*Primary Examiner* — Peter J Bertheaud
(74) *Attorney, Agent, or Firm* — Integrity Patent Group; Charles Runyan (57) ABSTRACT

A system for removing a volume of liquid including a pressure-sealed-pump-vessel, at least one liquid-aperture, a liquid-level-control-valve, a liquid-discharge, a sump-pump, a pressure-sealed-suction-vessel, and one or more vessel-connections. The one or more vessel-connections configured to fluidly couple the pressure-sealed-pump-vessel and the pressure-sealed-suction-vessel, in the preferred embodiment. The sump-pump is located within the pressure-sealed-pump-vessel and includes a pump-inlet and a pump-outlet. The pump-inlet fluidly coupled to the liquid-aperture, and the pump-outlet is fluidly coupled to the liquid-discharge. The sump-pump configured to pump the volume of liquid from the pressure-sealed-pump-vessel and from the system via the liquid-discharge to remove the volume of water from a roof surface or other similar horizontal or substantially horizontal surface.

20 Claims, 5 Drawing Sheets

(56) References Cited

U.S. PATENT DOCUMENTS

| | | | | |
|---|---|---|---|---|
| 4,801,376 A | * | 1/1989 | Kulitz | E04H 4/1636 134/21 |
| 4,976,850 A | * | 12/1990 | Kulitz | A47L 7/0019 15/353 |
| 5,349,722 A | * | 9/1994 | Chayer | A47L 7/0009 15/245 |
| 5,465,455 A | * | 11/1995 | Allen | A47L 7/0028 15/319 |
| 6,453,507 B1 | * | 9/2002 | Gilbert | A47L 7/0009 15/321 |
| 6,889,912 B2 | | 5/2005 | Clum et al. | |
| 7,316,049 B1 | * | 1/2008 | Robinson, Sr. | A47L 5/36 15/327.2 |
| 8,740,576 B2 | | 6/2014 | Konnur | |
| 9,771,712 B1 | * | 9/2017 | Wilson | E03F 5/22 |
| 2002/0152578 A1 | * | 10/2002 | Lee | A47L 7/0038 15/353 |
| 2009/0123293 A1 | * | 5/2009 | Gierer | A47L 5/22 417/17 |

* cited by examiner

VACUUM-ASSISTED-PUMPING SYSTEM AND METHOD

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of water removal and more specifically relates to a vacuum-assisted-pumping system.

2. Description of Related Art

A flat roof is a roof which is substantially level in regards to the many types of typically sloped roofs. Most flat roofs are used in arid/dry climates. In drier and warmer climates, where there is less rainfall and freezing is unlikely to occur, flat roofs may be employed to save time, energy, and money during construction and use.

Traditionally most flat roofs in the western world make use of tar, asphalt, or felt paper applied over roof decking to keep a building watertight. A main reason for failure of these flat-type roofs is lack of maintenance when events cause water buildup upon the flat roof due to the flat slope and relatively slow drainage conditions due to the flat slope. Standing and ponded water can infiltrate small cracks or other openings, or in some cases cause algae or buildup of other naturally occurring phenomenon.

General flat roof maintenance includes getting rid of/disposing of ponded water, typically as soon as possible and/or during after a precipitation event. This is typically accomplished by adding roof drains and/or pumping the water from the roof surface. However, in most cases, pumping and/or draining fails to remove a small instance of water, leaving a few inches upon the roof surface. Some roof systems may employ a sump pump system to concentrate the remaining water into a specific location, but are often limited by the inlet suction capacity of the pump, also leaving water upon the roof. Also, most pumping system may require a net positive suction head, therefore limiting by the capacity and/or ability of the pump. Therefore a suitable solution is desired.

Several attempts have been made to solve the above-mentioned problems such as those found in U.S. and Foreign Pat. and Pub. Nos. U.S. Pat. No. 4,514,977 to Bowen; U.S. Pat. No. 4,133,072 to Face, Jr.; U.S. Pat. No. 6,889,912 to Clum et al.; U.S. Pat. No. 8,740,576 to Konnur; KR 2003/0,065,250 to Sang Ha et al.; CN 202,483,906 to Rui et al.; CN 201,953,665 to Hui et al.; JP 2000/240,600 to Takeo et al.; CN 204,113,770 to Guard et al.; and CN 202,937,521 to Wei et al. This art is representative of water removal. However, none of the above inventions and patents, taken either singly or in combination, is seen to describe the invention as claimed.

BRIEF SUMMARY OF THE INVENTION

In view of the foregoing disadvantages inherent in the known liquid removal art, the present invention provides a novel vacuum-assisted-pumping system. The general purpose of the present invention, which will be described subsequently in greater detail is to provide a device useful for removing a volume of liquid (e.g., water, etc.) from a flat roof of a building by utilizing a vacuum pump to assist a pump in collecting and discharging the liquid and to increase the capacity of the liquid removal system.

A system for removing a volume of liquid, which may be referred to as a vacuum-assisted-pumping system from a horizontal-surface is disclosed herein, in a preferred embodiment, comprising a pump-vessel, at least one liquid-aperture, a liquid-level-control-valve, a liquid-discharge, a sump-pump, a suction-vessel, and one or more vessel-connections, in functional combination. The one or more vessel-connections are configured to fluidly couple the pump-vessel and the suction-vessel, in the preferred embodiment.

In the preferred embodiment, the sump-pump is located within the pump-vessel and includes a pump-inlet and a pump-outlet. The pump-inlet is preferably fluidly coupled to the liquid-aperture, and the pump-outlet is fluidly coupled to the liquid-discharge. The sump-pump is preferably configured to pump the volume of liquid from the pump-vessel and from the system via the liquid-discharge to remove the volume of liquid from a roof surface or other similar horizontal or substantially horizontal surface. The present invention may be also used in restoration work in basements or where ever there is pooled water.

In the preferred embodiment, the suction-vessel includes a vacuum-pump configured to provide a low-pressure condition (e.g., pressure less than standard atmospheric pressure) within the suction-vessel and within the pump-vessel, such that the volume of liquid is drawn from the horizontal-surface into the pump-vessel through the at least one liquid-aperture and to the liquid-inlet of the sump-pump.

The pump-vessel (in the preferred embodiment) further includes a plurality of standoffs configured to set the pump-vessel at a distance immediately above the horizontal-surface to allow the volume of liquid with an adequate flow channel, in the preferred embodiment.

The liquid-level-control-valve is configured to control a liquid-level of the volume of liquid within the suction-vessel by interrupting the low-pressure condition created by the vacuum-pump, with the liquid-level-control-valve preferably manually operable by a user. Preferably, the vacuum-pump is removably affixed to a top of the suction-vessel and the sump-pump is removably installed within the pump-vessel such that the vacuum-pump and/or the sump-pump may be removed and/or replaced for maintenance. In the preferred embodiment the sump-pump and the vacuum-pump are each electrically driven.

The system for removing a volume of liquid from a horizontal-surface is structured and arranged to sit upon the horizontal-surface and the system is preferably arranged such that the volume of liquid has a viscosity substantially similar to water.

A kit is also disclosed, the kit comprising: a pump-vessel, at least one liquid-aperture, a liquid-level-control-valve, a liquid-discharge, a sump-pump, a suction-vessel, and one or more vessel-connections.

According to another embodiment, a method for using a vacuum-assisted-pumping system is also disclosed herein. The method for providing system for removing a volume of liquid from a horizontal-surface includes the steps of: providing a vacuum-assisted-pumping system, placing the vacuum-assisted-pumping system upon a horizontal-surface, operating the vacuum-assisted-pumping system to remove a volume of water from the horizontal-surface, ceasing operation of the vacuum-assisted-pumping system, and removing the vacuum-assisted-pumping system from the horizontal-surface The present invention holds significant improvements and serves as a vacuum-assisted-pumping system. Preferably, a vacuum-assisted-pumping system should provide a device useful for removing substantially most of the water form a horizontal-surface (e.g., flat-roof, etc.) and, yet would operate reliably and be manufactured at a modest expense. The present invention may be also used in restoration work in basements or wherever there is pooled water. Thus, a need exists for a reliable a vacuum-assisted-pumping system to avoid the above-mentioned problems.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present disclosure, a vacuum-assisted-pumping system, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to water removal and more particularly to a vacuum-assisted-pumping system as used to improve the the capacity of water removal from a horizontal-surface by incorporating a vacuum-pump to draw water into the system to provide an increased liquid-level to a sump-pump.

Generally speaking, a vacuum-assisted-pumping system raises a liquid (such as water) level available to a sump pump such that the sump pump may increase capacity and increase the amount of liquid that can be pumped, thereby leaving less unpumped liquid/water. A vacuum canister includes a vacuum motor, a bottom suction inlets assembly of holes and an exhaust assembly including a liquid pump and an operating electrical circuit. Upon activation, the vacuum motor and the pump sucks air and the liquid refuse into the canister from the bottom of the canister. Within seconds the canister is filled with water using the Plexiglas airflow valve you can get the level you like and just walk away. There is no need to watch the process. You put the unit in the lowest part of the water and as soon as the water reaches the pump, it pumps it out through the exhaust assembly. As the water level goes down you need more air so you can close the air valve and squeegee to the tank to eliminate the water. This invention relates to a wet vacuum apparatus for continually picking up a liquid and conveying it into a tank or drain and simultaneously removing liquid from the tank at a steady rate. As a result, the invention offers all the advantages of a conventional wet vacuum, ex. You can put the wet vacuum in the lower point of the liquid and vacuum it up from the bottom of the vacuum by adjusting the air flow to bring the desired height of the liquid inside the tank. Just squeegee the area when the liquid gets low. You can do a very large area at one time. The further object of this invention is to provide a wet vacuum apparatus that can continuously pick up water form a wet area and convey that liquid to another location without repeated emptying the container. Another additional object of this invention is to provide a wet vacuum apparatus that is easy to operate. There is a flotation ball to block the air flow just in case the liquid level test too high.

Referring now more specifically to the drawings by numerals of reference there is shown in FIGS. 1-4B, various views of vacuum-assisted-pumping system 100 which may comprise pump-vessel 110. Pump-vessel 110 may include, at least, one liquid-aperture 112, liquid-level-control-valve 114, liquid-discharge 116, and sump-pump 118; where each may be contained within pump-vessel 110 which may further include a pump-inlet and a pump-outlet; the pump-inlet being fluidly coupled to liquid-aperture 112; the pump-outlet being fluidly coupled to liquid-discharge 116, sump-pump 118 being configured to pump volume of liquid 144 from pump pump-vessel 110 and from system 100 via liquid-discharge 116. Vacuum-assisted-pumping system 100 may be structured and arranged to sit upon horizontal-surface 146. Sump-pump 118 may be removably installed within pump-vessel 110.

Additionally, vacuum-assisted-pumping system 100 may include one or more vessel-connections 126 configured to fluidly couple pump-vessel 110 and suction-vessel 124. In some versions, the liquid-level-control-valve 114 comprises a visual port that is configured to allow a user to see a liquid-level within said suction-vessel 124 and further configured to enable the user to adjust the liquid-level with suction-vessel 124 by adjusting the air flow through said liquid-level-control-valve 114.

Vacuum-assisted-pumping system 100 may include suction-vessel 124 including vacuum-pump 128 configured to provide a low-pressure condition within suction-vessel 124 and within pump-vessel 110, such that volume of liquid 144 may be drawn from horizontal-surface 146 into pump-vessel 110 through at least one liquid-aperture 112 to the liquid-inlet of sump-pump 118.

Liquid-level-control-valve 114 may be configured to control a liquid-level 142 of volume of liquid 144 within suction-vessel 124 by interrupting the low-pressure condition created by vacuum-pump 128. Volume of liquid 144 may have a viscosity substantially similar to water. Liquid-level-control-valve 114 may be manually operable by a user or may be configured to operate automatically. In embodiments, vacuum-assisted-pumping system 100 may include at least one liquid-level-sensor configured to operate vacuum-pump 128 and/or sump-pump 118 automatically and in response to a predetermined liquid-level 142 on horizontal-surface 146.

Pump-vessel 110 may further include a plurality of stand-offs 120 configured to set pump-vessel 110 at a distance immediately above horizontal-surface 146 and vacuum-pump 128 may be removably affixed to the top of suction-vessel 124.

In embodiments, vacuum-assisted-pumping system 100 may further include a plurality of wheels configured such that system 100 is manually transportable, or may be persistently affixed to horizontal-surface 146 such that system 100 is not easily manually transportable.

In some embodiments sump-pump 118 and/or vacuum-pump 128 may each be electrically-driven. Other embodiments may include sump-pump 118 and/or vacuum-pump 128 which may be hydraulically-driven. Further embodiments may include sump-pump 118 and/or vacuum-pump 128 may each be engine-driven. It may not be required for each sump-pump 118 and/or vacuum-pump to be driven via the same mechanism, depending upon user preferences and site conditions.

Vacuum-assisted-pumping system 100 may be sold as a kit comprising the following parts: at least one pump-vessel 110; at least one suction-vessel 124; at least one sump-pump 118; at least one vacuum-pump 128; at least one liquid-discharge 116; at least one vessel-connection 126; and at least one set of user instructions. The kit has instructions such that functional relationships are detailed in relation to the structure of the invention (such that the invention can be used, maintained, or the like in a preferred manner).

Vacuum-assisted-pumping system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different pump component combinations, parts may be sold separately, etc., may be sufficient.

Figure 1:
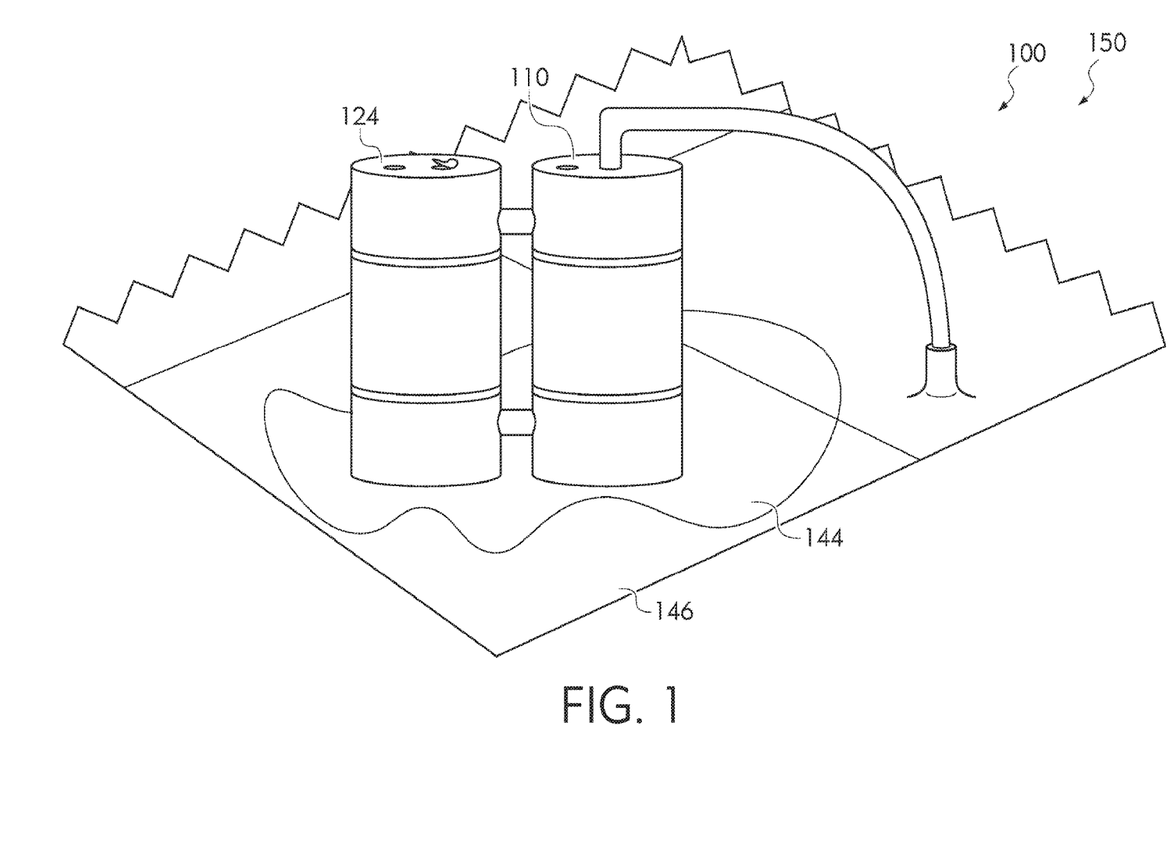
FIG. 1 shows a perspective view illustrating a vacuum-assisted-pumping system during an 'in-use' condition according to an embodiment of the disclosure.
Figure 2:
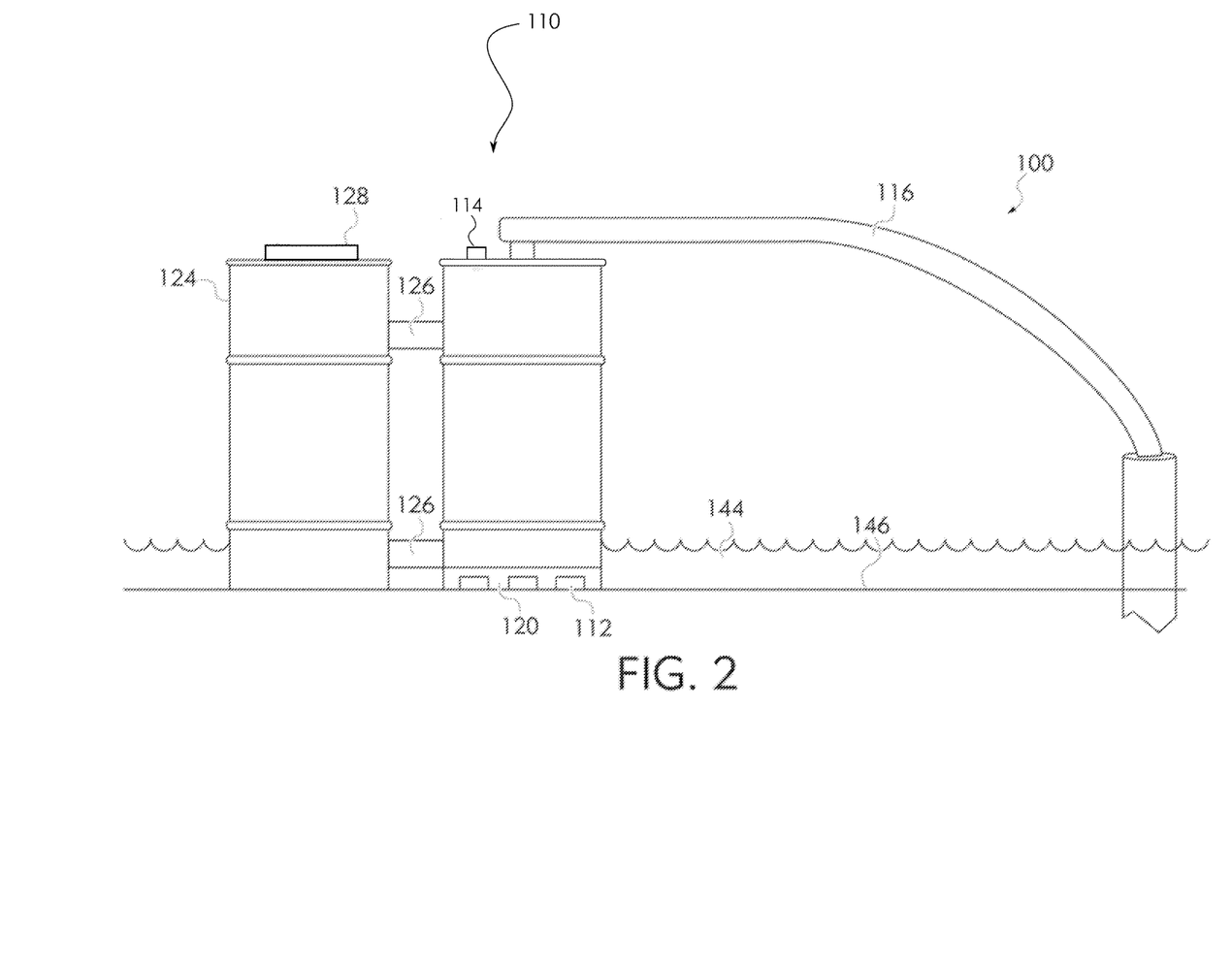
FIG. 2 is a perspective view illustrating the vacuum-assisted-pumping system comprising a pump-vessel and a suction-vessel according to an embodiment of the present invention of the disclosure.
Figure 3:
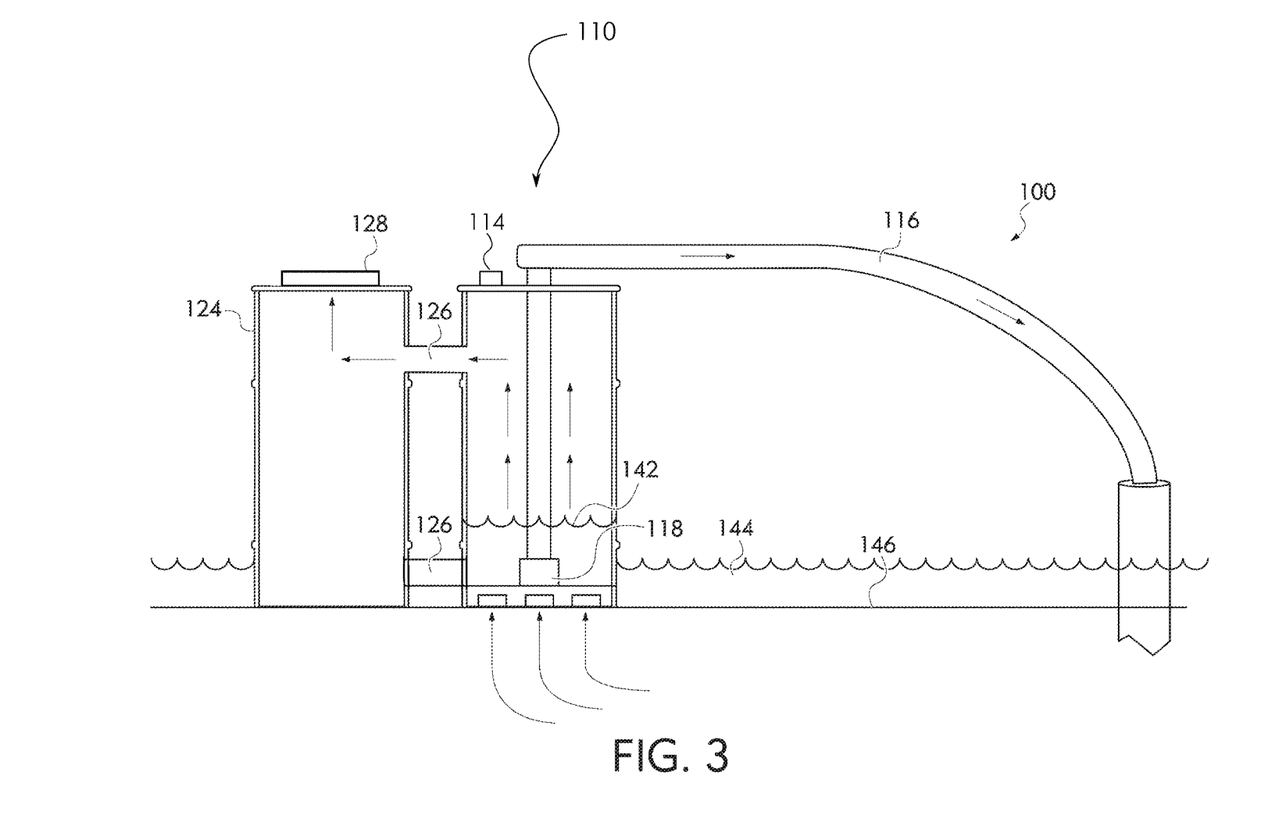
FIG. 3 is a cross-sectional perspective view illustrating the pump-vessel and the suction-vessel of the vacuum-assisted-pumping system according to an embodiment of the present disclosure.
Figure 4A:
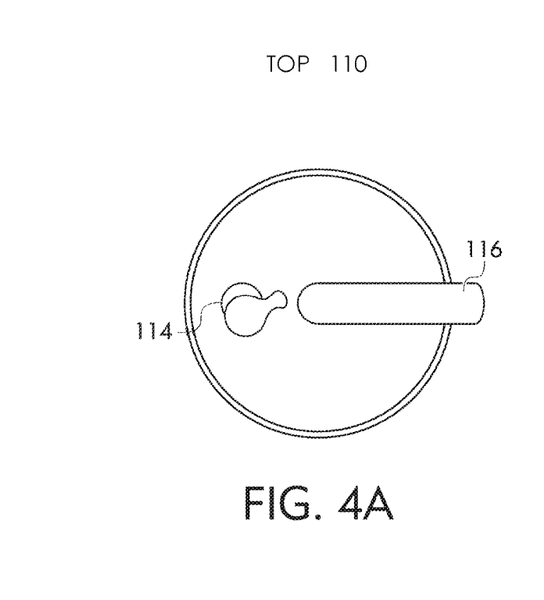
FIG. 4A is a top-perspective view illustrating the pump-vessel of the vacuum-assisted-pumping system according to an embodiment of the present disclosure.
Figure 4B:
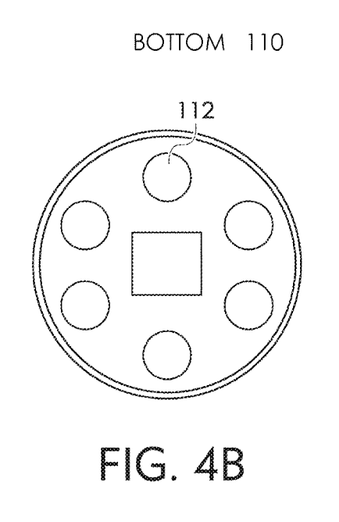
FIG. 4B is a bottom-perspective view illustrating a pump-vessel of the vacuum-assisted-pumping system according to an embodiment of the present disclosure.
Figure 5:
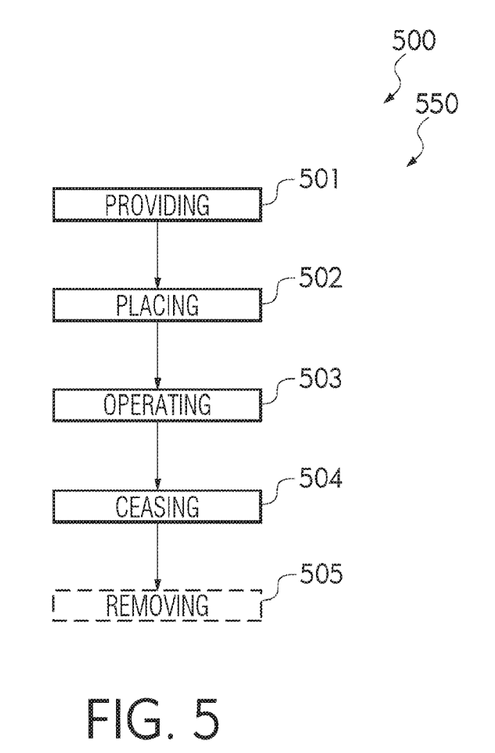
FIG. 5 is a flow diagram illustrating a method of use for a vacuum-assisted-pumping system according to an embodiment of the present disclosure.

Referring now to FIG. 5 showing a flow diagram 550 illustrating method of use 500 for vacuum-assisted-pumping system 100 according to an embodiment of the present invention of FIGS. 1-4B. As shown, method of use 500 may comprise the steps of: step one 501, providing vacuum-assisted-pumping system 100; step two 502, placing vacuum-assisted-pumping system 100 upon horizontal-surface 146; step three 503, operating vacuum-assisted-pumping system 100 to remove volume of liquid 144 from horizontal-surface 146; step four 504, ceasing operation of vacuum-assisted-pumping system 100; and step five 505, removing vacuum-assisted-pumping system 100 from horizontal-surface 146.

It should be noted that step five 505 is an optional step and may not be implemented in all cases. The optional step of method of use 500 is illustrated using dotted lines in FIG. 5 so as to distinguish it from the other steps of method of use 500.

It should be noted that the steps described in the method of use can be carried out in many different orders according to user preference. The use of "step of" should not be interpreted as "step for", in the claims herein and is not intended to invoke the provisions of 35 U.S.C. § 112 (f). Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A system for removing a volume of liquid from a horizontal-surface, said system comprising:
    a) a pump-vessel including, in functional combination:
        i) at least one liquid-aperture;
        ii) a liquid-discharger; and
        iii) a sump-pump within said pump-vessel and including a pump-inlet and a pump-outlet, said pump-inlet being fluidly coupled to said at least one liquid-aperture, said pump-outlet being fluidly coupled to said liquid-discharger, said sump-pump being configured to pump said volume of liquid from said pump-vessel and from said system via said liquid-discharger;
    b) a suction-vessel including:
        i) a vacuum-pump configured to provide a low-pressure condition within said suction-vessel and within said pump-vessel, such that said volume of liquid is drawn from said horizontal-surface into said pump-vessel through said at least one liquid-aperture and to said pump-inlet of said sump-pump;
        ii) a liquid-level-control-valve comprising a visual port that is configured to allow a user to see a liquid-level within said suction-vessel and further configured to enable the user to adjust the liquid-level within the suction-vessel by adjusting the air flow through said liquid-level-control-valve;
    c) at least one vessel-connection configured to fluidly couple said pressure sealed-pump-vessel and said suction-vessel;
    d) wherein said sump-pump is a separate vessel from said vacuum-pump;
    e) wherein said sump-pump is structured and arranged with said pump-vessel and said vacuum-pump to increase pumping capacity of the system and increase the amount of liquid that can be pumped from the horizonal surface;

f) wherein said pump-vessel is structured and arranged to sit upon said horizontal-surface; and g) wherein said volume of liquid has a viscosity substantially similar to water.

2. The system of claim 1, wherein said pump-vessel is structured and arranged for persistently affixing to a horizontal-surface.

3. The system of claim 1, wherein said pump-vessel further includes a plurality of standoffs configured to set said pump-vessel at a distance immediately above said horizontal-surface.

4. The system of claim 1, wherein said vacuum-pump is removably affixed to a top of said suction-vessel.

5. The system of claim 1, wherein said sump-pump is removably installed within said pump-vessel.

6. The system of claim 1, wherein said liquid-level-control-valve is manually operable by a user.

7. The system of claim 1, wherein said liquid-level-control-valve is configured to operate automatically.

8. The system of claim 1, wherein said sump-pump is electrically-driven.

9. The system of claim 1, wherein said sump-pump is engine-driven.

10. The system of claim 1, wherein said sump-pump is hydraulically-driven.

11. The system of claim 1, wherein said vacuum-pump is electrically-driven.

12. The system of claim 1, wherein said vacuum-pump is engine-driven.

13. The system of claim 1, wherein said vacuum-pump is hydraulically-driven.

14. The system of claim 1, further including a plurality of wheels configured such that said system is manually transportable.

15. The system of claim 1, wherein said system is persistently affixed to said horizontal-surface such that said system is not manually transportable.

16. The system of claim 1, further including at least one liquid-level-sensor configured to operate said vacuum-pump and said sump-pump automatically and in response to a predetermined water level on said horizontal-surface.

17. A system for removing a volume of liquid from a horizontal-surface, the system comprising:

a) a pump-vessel including, in functional combination:
  i) at least one liquid-aperture;
  ii) a liquid-discharger; and
  iii) a sump-pump within said pump-vessel and including a pump-inlet and a pump-outlet, said pump-inlet being fluidly coupled to said at least one liquid-aperture, said pump-outlet being fluidly coupled to said liquid-discharger, said sump-pump being configured to pump said volume of liquid from said pump-vessel and from said system via said liquid-discharger;

b) a suction-vessel including:
  i) a vacuum-pump configured to provide a low-pressure condition within said suction-vessel and within said pump-vessel, such that said volume of liquid is drawn from said horizontal-surface into said pump-vessel through said at least one liquid-aperture and to said pump-inlet of said sump-pump;
  ii) a liquid-level-control-valve comprising a visual port that is configured to allow a user to see a liquid-level within said suction-vessel and further configured to enable the user to adjust the liquid-level within the suction-vessel by adjusting the air flow through said liquid-level-control-valve;
and c) at least one vessel-connection configured to fluidly couple said pump-vessel and said suction-vessel;

d) wherein said sump-pump is structured and arranged with said pump-vessel and said vacuum-pump to increase pumping capacity of the system and increase the amount of liquid that can be pumped from the horizontal surface;

e) wherein said system is structured and arranged to sit upon said horizontal-surface;

f) wherein said volume of liquid has a viscosity substantially similar to water;

g) wherein said pump-vessel further includes a plurality of standoffs configured to set said pump-vessel at a distance immediately above said horizontal-surface;

h) wherein said vacuum-pump is removably affixed to a top of said suction-vessel;

i) wherein said sump-pump is removably installed within said pump-vessel;

j) wherein said liquid-level-control-valve is manually operable by a user; and k) wherein said sump-pump and said vacuum-pump are each electrically driven.

18. The system of claim 17 further comprising a set of user instructions wherein the system is arranged as kit.

19. A method of using the system for removing a volume of liquid from a horizontal-surface of claim 17, the method comprising the steps of:

(a) providing a vacuum-assisted-pumping system;

(b) placing said vacuum-assisted-pumping system upon a horizontal-surface;

(c) operating said vacuum-assisted-pumping system to remove a volume of water from said horizontal-surface; and (d) ceasing operation of said vacuum-assisted-pumping system.

20. The method of claim 19 further comprising the step of removing said vacuum-assisted-pumping system from said horizontal-surface.

* * * * *